(12) United States Patent
Lee et al.

(10) Patent No.: US 11,201,357 B2
(45) Date of Patent: Dec. 14, 2021

(54) FLEXIBLE SECONDARY BATTERY COMPRISING BIPOLAR ELECTRODE

(71) Applicant: LG Chem, Ltd., Seoul (KR)

(72) Inventors: Jung-Pil Lee, Daejeon (KR); In-Sung Uhm, Daejeon (KR); Sung-Joong Kang, Daejeon (KR); Hyo-Sik Kim, Daejeon (KR)

(73) Assignee: LG Chem, Ltd.

( * ) Notice: Subject to any disclaimer, the term of this patent is extended or adjusted under 35 U.S.C. 154(b) by 133 days.

(21) Appl. No.: 16/635,409

(22) PCT Filed: Dec. 21, 2018

(86) PCT No.: PCT/KR2018/016542
§ 371 (c)(1),
(2) Date: Jan. 30, 2020

(87) PCT Pub. No.: WO2019/125085
PCT Pub. Date: Jun. 27, 2019

(65) Prior Publication Data
US 2021/0036378 A1 Feb. 4, 2021

(30) Foreign Application Priority Data
Dec. 21, 2017 (KR) .......................... 10-2017-0177376

(51) Int. Cl.
*H01M 10/0587* (2010.01)
*H01M 4/36* (2006.01)
(Continued)

(52) U.S. Cl.
CPC ....... *H01M 10/0587* (2013.01); *H01M 4/366* (2013.01); *H01M 4/62* (2013.01);
(Continued)

(58) Field of Classification Search
CPC ....................................................... H01M 4/78
See application file for complete search history.

(56) References Cited

U.S. PATENT DOCUMENTS

2010/0173205 A1   7/2010   Zeng et al.
2013/0266876 A1   10/2013  Shechter et al.
(Continued)

FOREIGN PATENT DOCUMENTS

EP       3244476 A1      11/2017
JP       2004127559 A    4/2004
(Continued)

OTHER PUBLICATIONS

Search report from International Application No. PCT/KR2018/016542, dated Apr. 18, 2019.
(Continued)

*Primary Examiner* — Brian R Ohara
(74) *Attorney, Agent, or Firm* — Lerner, David, Littenberg, Krumholz & Mentlik, LLP (57) ABSTRACT

A flexible secondary battery includes an electrode support; a sheet-type internal electrode wound helically outside of the electrode support; a sheet-type first solid electrolyte layer wound helically outside of the internal electrode; a sheet-type bipolar electrode wound helically outside of the first solid electrolyte layer; a sheet-type second solid electrolyte layer wound helically outside of the bipolar electrode; and a sheet-type external electrode wound helically outside of the second solid electrolyte layer, wherein each of the first and second solid electrolyte layers include an organic solid electrolyte, the internal electrode is provided with insulation coating portions at both longitudinal ends of one surface facing the first solid electrolyte layer, the external electrode is provided with insulation coating portions at both longitudinal ends of one surface facing the second solid electrolyte layer, and the bipolar electrode is provided with insu-
(Continued)

lation coating portions at both longitudinal ends of both surfaces.

15 Claims, 2 Drawing Sheets

(51) Int. Cl.
    *H01M 4/62*     (2006.01)
    *H01M 4/78*     (2006.01)
    *H01M 10/0562*     (2010.01)
    *H01M 10/0565*     (2010.01)
    *H01M 4/02*     (2006.01)

(52) U.S. Cl.
    CPC ......... *H01M 4/78* (2013.01); *H01M 10/0562* (2013.01); *H01M 10/0565* (2013.01); *H01M 2004/029* (2013.01); *H01M 2300/0071* (2013.01); *H01M 2300/0082* (2013.01)

(56) References Cited

U.S. PATENT DOCUMENTS

| | | |
|---|---|---|
| 2014/0377617 A1 | 12/2014 | Kwon et al. |
| 2017/0200979 A1 | 7/2017 | Kwon et al. |
| 2018/0034108 A1 | 2/2018 | Uhm et al. |
| 2018/0294532 A1 | 10/2018 | Uhm et al. |
| 2018/0323418 A1 | 11/2018 | Uhm et al. |

FOREIGN PATENT DOCUMENTS

| | | |
|---|---|---|
| JP | 2004342358 A | 12/2004 |
| KR | 20150146433 A | 12/2015 |
| KR | 20160098095 A | 8/2016 |
| KR | 101735513 B1 | 5/2017 |
| KR | 20170093753 A | 8/2017 |
| WO | 2016129939 A1 | 8/2016 |
| WO | 2017069586 A1 | 4/2017 |

OTHER PUBLICATIONS

Extended European Search Report including Written Opinion for Application No. EP18893276.8, dated Nov. 12, 2020, pp. 1-8.

FLEXIBLE SECONDARY BATTERY COMPRISING BIPOLAR ELECTRODE

CROSS-REFERENCE TO RELATED APPLICATIONS

The present application is a national phase entry under 35 U.S.C. § 371 of International Application No. PCT/KR2018/016542, filed Dec. 21, 2018, published in Korean, which claims priority to Korean Patent Application No. 10-2017-0177376 filed on Dec. 21, 2017 in the Republic of Korea, the disclosures of which are incorporated herein by reference.

TECHNICAL FIELD

The present disclosure relates to a flexible secondary battery including a bipolar electrode. More particularly, the present disclosure relates to a flexible secondary battery including a bipolar electrode capable of realizing a high voltage.

BACKGROUND ART

A secondary battery refers to a device which converts external electric energy into the form of chemical energy, stores the chemical energy therein and generates electricity as necessary. Such a secondary battery allows repeated charging, and thus is also called 'rechargeable battery'. Currently used secondary batteries include lead storage batteries, nickel cadmium batteries (NiCd), nickel metal hydride storage batteries (NiMH), lithium ion batteries (Li-ion) and lithium ion polymer batteries (Li-ion polymer). Such secondary batteries provide both an economical advantage and an eco-friendly advantage, as compared to disposable primary batteries.

Currently, secondary batteries are used for applications requiring low electric power. Such applications include instruments that help start-up of cars, portable devices, tools and uninterruptable power supplies. Recently, since development of wireless communication technology leads popularization of portable devices and tends to convert many kinds of conventional devices into wireless devices, secondary batteries are increasingly in demand. In addition, hybrid vehicles and electric vehicles have been commercialized with a view to preventing environmental pollution and such next-generation vehicles use secondary batteries to reduce the cost and weight and to improve the service life.

In general, lithium secondary batteries are provided in the form of cylindrical batteries, prismatic batteries or pouch-type batteries. This is because a secondary battery is obtained by installing an electrode assembly including a negative electrode, a positive electrode and a separator inside of a cylindrical or prismatic metallic can or a pouch-type casing made of an aluminum laminate sheet, and injecting an electrolyte to the electrode assembly. Therefore, a predetermined space for installing the secondary battery is required essentially, and such cylindrical, prismatic or pouch-like shapes of secondary batteries undesirably function as a limitation in developing portable systems having various shapes. Thus, there has been a need for developing a novel type of secondary battery which allows easy deformation.

A cable-type secondary battery as a typical example of such flexible batteries has a linear structure which has a predetermined shape of horizontal section and is elongated along the longitudinal direction based on the horizontal section, and allows free deformation by virtue of its flexibility. Such a cable-type secondary battery may be formed by providing an internal electrode having an electrode active material layer around the circumference of a wire-type current collector, an electrolyte layer and an external electrode, successively.

Such a cable-type secondary battery generally has a low voltage and thus is limited in application spectrum. In addition, when using a liquid electrolyte for forming a cable-type secondary battery, it is difficult to connect unit cells in series, resulting in a limitation in realizing a high-voltage cell.

Although many electric instruments are designed to be driven at a low voltage, electric vehicles or the like that are increasingly in demand recently are driven in a high-voltage system. As a result, it is required to develop a flexible battery which allows easy deformation, while satisfying diverse voltage ranges.

DISCLOSURE

Technical Problem

Therefore, the present disclosure is directed to providing a novel linear flexible secondary battery which allows easy deformation and realizes a high voltage.

Technical Solution

In one aspect of the present disclosure, there is provided a flexible secondary battery including: an electrode support; a sheet-type internal electrode wound helically outside of the electrode support; a sheet-type first solid electrolyte layer wound helically outside of the internal electrode; a sheet-type bipolar electrode wound helically outside of the first solid electrolyte layer; a sheet-type second solid electrolyte layer wound helically outside of the bipolar electrode; and a sheet-type external electrode wound helically outside of the second solid electrolyte layer, wherein each of the first solid electrolyte layer and the second solid electrolyte layer includes an organic solid electrolyte, the internal electrode is provided with insulation coating portions at both longitudinal ends of one surface facing the first solid electrolyte layer, the external electrode is provided with insulation coating portions at both longitudinal ends of one surface facing the second solid electrolyte layer, and the bipolar electrode is provided with insulation coating portions at both longitudinal ends of opposing surfaces thereof.

The internal electrode and the external electrode may be wound in such a manner that the insulation coating portions provided at both longitudinal ends may face each of the first solid electrolyte layer and the second solid electrolyte layer.

The flexible secondary battery may be further provided with at least one further sheet-type solid electrolyte layer and at least one further sheet-type bipolar electrode between the bipolar electrode and the second solid electrolyte layer.

The organic solid electrolyte may be a solid polymer electrolyte selected from polyethylene oxide (PEO), polypropylene oxide (PPO), polyethylene imine (PEI), polyethylene sulfide (PES) and polyvinyl acetate (PVAc); or a gel polymer electrolyte using a polymer selected from polyethylene oxide (PEO), polyvinylidene fluoride (PVdF), polyvinylidene fluoride-co-hexafluoropropylene (PVdF-HFP), polymethyl methacrylate (PMMA), polyacrylonitrile (PAN) and polyvinyl acetate (PVAc).

Each of the insulation coating portions provided in the sheet-type internal electrode, the bipolar electrode and the external electrode may independently have a width corresponding to 1-50%, particularly 5-10%, based on the width of the respective sheet-type electrode.

At least one of the insulation coating portions may include oxide, carbide or nitride of an element selected from the group consisting of Fe, Ca, Ba, Zn, Al, Ni, Sn, Cu, Cr, Cd, Nd, Mn, Mo, Si, Ti, W, Bi, Sr, Li, Y, Mg, Ce, Hf and V, or a combination thereof.

At least one of the insulation coating portions may include an oxide-based solid electrolyte.

The oxide-based solid electrolyte may include a solid electrolyte having a structure of Li-A-O (wherein A is La, Zr, Ti, Al, P, I or a combination thereof), such as $Li_{3x}La_{2/3-x}TiO_3$ (LLTO, 0<x<1), $Li_7La_3Zr_2O_{12}$ (LLZO), $Li_{1+x}Al_xTi_{2-x}(PO_4)_3$ (LATP, 0<x<1), $Li_{1+x}Al_xGe_{2-x}(PO_4)_3$ (LAGP, 0<x<1), $Li_{1-4}Zn(GeO_4)_4$, $Li_3N$, $Li_{3+y}PO_{4-x}N_x$ (LIPON, 0<x<4, 0<y<3), $Li_{3.6}Si_{0.6}P_{0.4}O_4$, or a combination thereof.

The internal electrode may include an internal current collector and an internal electrode active material layer formed on one surface of the internal current collector, the external electrode may include an external current collector and an external electrode active material layer formed on one surface of the external current collector, and the bipolar electrode may include a bipolar electrode current collector, a positive electrode active material layer formed on one surface of the current collector and a negative electrode active material layer formed on another surface of the current collector.

The sheet-type internal electrode, the first solid electrolyte layer, the bipolar electrode, the second solid electrolyte layer and the external electrode may each have a strip-like structure extended in one direction.

The electrode support may have an open structure having a space therein.

The electrode support may include at least one helically wound wire, at least one helically wound sheet, twisted wire, linear wire, hollow fiber, mesh-type support, at least two linear wire supports disposed in parallel with each other, or at least two wire-type supports wound helically so that they may cross each other.

In the space formed inside of the electrode support, an internal electrode current collector core portion, an electrolyte-containing lithium ion supplying core portion, or a filler core portion may be formed.

The flexible secondary battery may further include a protective coating formed to surround an outer surface of the external electrode.

Advantageous Effects

The flexible secondary battery according to an embodiment of the present disclosure is provided with an internal electrode, a bipolar electrode and an external electrode separated from one another by a solid electrolyte layer. It is possible to design the flexible secondary battery to have diverse voltage ranges from a low voltage to a high voltage by increasing the number of bipolar electrodes, if desired.

In addition, according to the present disclosure, each of the internal electrode, the bipolar electrode and the external electrode is provided with insulation coating portions at both longitudinal ends of the surface facing the organic solid electrolyte layer. Thus, both ends of each electrode can prevent the solid electrolyte layer, which has low strength caused by the nature of an organic material, from being damaged during the process for assemblage of a battery, thereby inhibiting a short-circuit.

Further, according to an embodiment of the present disclosure, the above-mentioned various electrodes and multiple solid electrolyte layers having sheet-like shapes are wound spirally on the electrode support having an open structure, like a spring structure. As a result, the flexible battery can maintain its linear shape and show flexibility capable of releasing stress caused by external force.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect, there is provided a flexible secondary battery including: an electrode support; a sheet-type internal electrode wound spirally outside of the electrode support; a sheet-type first solid electrolyte layer wound spirally outside of the internal electrode; a sheet-type bipolar electrode wound spirally outside of the first solid electrolyte layer; a sheet-type second solid electrolyte layer wound spirally outside of the bipolar electrode; and a sheet-type external electrode wound spirally outside of the second solid electrolyte layer, wherein each of the first solid electrolyte layer and the second solid electrolyte layer includes an organic solid electrolyte, each of the internal electrode and the external electrode is provided with insulation coating portions at both longitudinal ends of one surface facing each of the first solid electrolyte layer and the second solid electrolyte layer, and the bipolar electrode is provided with insulation coating portions at both longitudinal ends of both surfaces.

As used herein, the term 'spiral' may be interchanged with 'helix', means a shape which winds diagonally in certain range, and generally refers to a shape similar to the shape of a general spring.

In addition, the term 'outside' used herein means the region outside of the corresponding portion and covers the portion that is in contact with the surface of the corresponding portion and the portions spaced apart from the corresponding portion. In the latter case, another layer may be interposed between the corresponding portion and the portion spaced apart therefrom.

Figure 1:
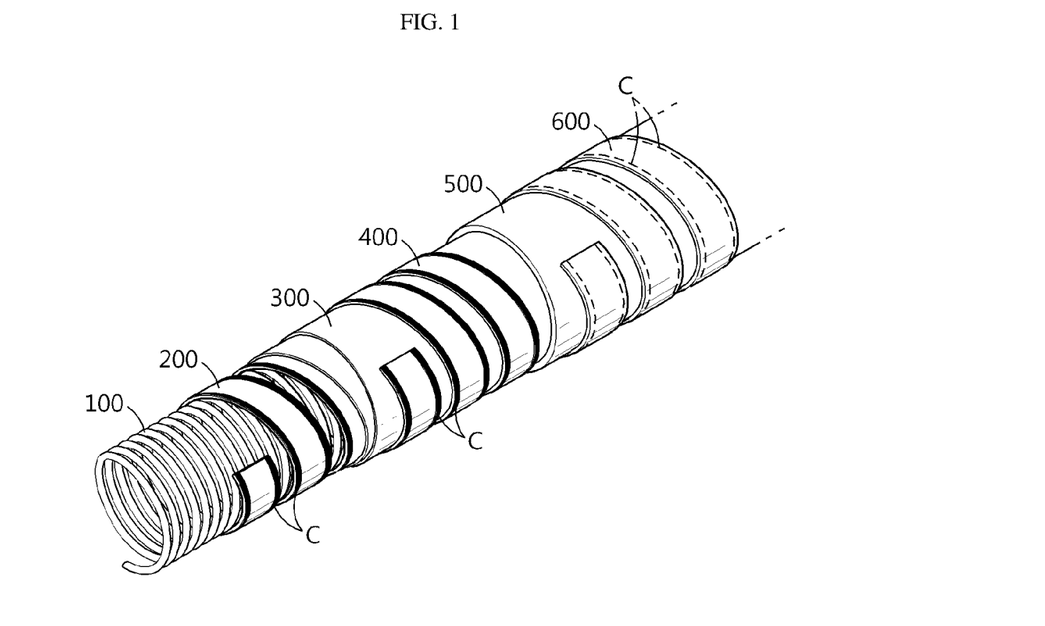
FIG. 1 shows the structure of the flexible secondary battery according to an embodiment of the present disclosure.

Referring to FIG. 1, the flexible secondary battery according to an embodiment of the present disclosure includes: an electrode support 100; a sheet-type internal electrode 200 wound spirally outside of the electrode support 100; a sheet-type first solid electrolyte layer 300 wound spirally outside of the internal electrode 200; a sheet-type bipolar electrode 400 wound spirally outside of the first solid electrolyte layer; a sheet-type second solid electrolyte layer 500 wound spirally outside of the bipolar electrode; and a sheet-type external electrode 600 wound spirally outside of the second solid electrolyte layer.

The sheet-type internal electrode, the first solid electrolyte layer, the bipolar electrode, the second solid electrolyte layer and the external electrode may have a strip-like structure extended in one direction. They may be wound spirally so that they are not overlapped one another or they are overlapped one another.

Figures 2, 3A:
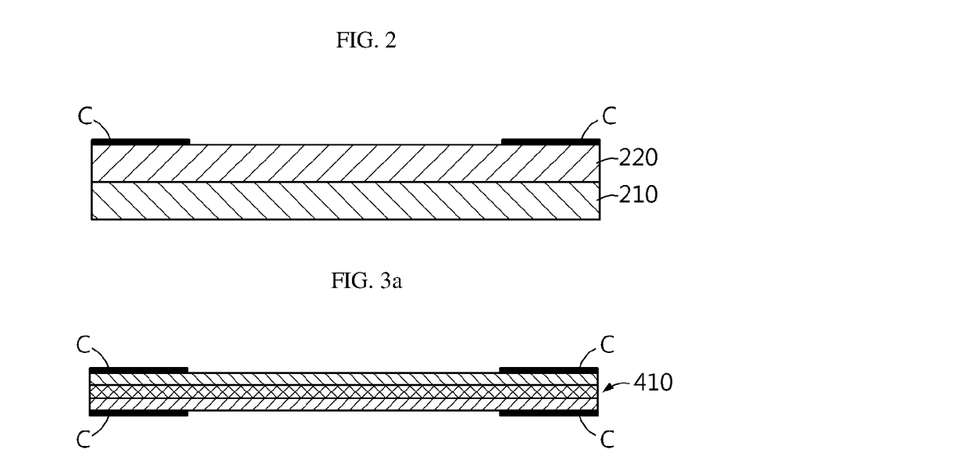
FIG. 2 shows the structure of a sheet-type internal electrode included in the flexible secondary battery according to an embodiment of the present disclosure.
FIG. 3a shows the structure of a sheet-type bipolar electrode included in the flexible secondary battery according to an embodiment of the present disclosure.

According to an embodiment of the present disclosure, as shown in FIG. 1 and FIG. 2, the internal electrode 200 includes an internal current collector 210 surrounding the outside of the electrode support 100 and an internal electrode active material layer 220 formed on one surface of the internal current collector, wherein the internal electrode active material layer 220 faces the first solid electrolyte layer 300.

Meanwhile, referring to FIG. 1 and FIG. 3a, the bipolar electrode 400 includes a bipolar electrode current collector 410, a positive electrode active material layer formed on one surface of the current collector, and a negative electrode active material layer formed on the other surface of the current collector, wherein the positive electrode active material layer and the negative electrode active material layer face the first solid electrolyte layer 300 and the second solid electrolyte layer 500, respectively. The bipolar electrode is a unit cell having a structure that includes a positive electrode layer and a negative electrode layer at the same time on a current collector. Herein, each electrode layer faces a solid electrolyte layer to allow flow of Li ions through the solid electrolyte layer, while inhibiting flow of electrons, which flow through the current collector. Such unit cells of the bipolar electrodes can be isolated electrochemically and thus can be connected in series. Thus, it is possible to control the operating voltage according to the number of bipolar electrodes connected in series.

Therefore, when the bipolar electrode is applied in combination with a solid electrolyte, it is possible to realize higher energy density as compared to the conventional battery using unit cells connected in parallel with a liquid electrolyte.

Figure 3B:
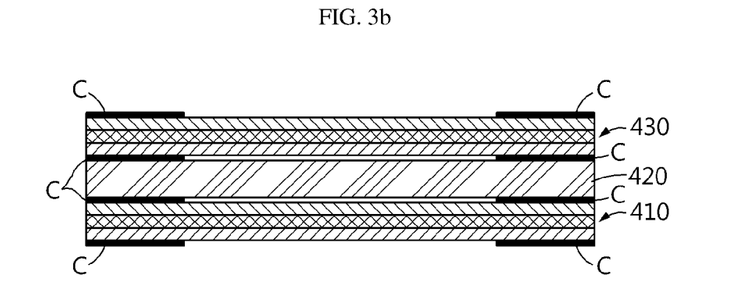
FIG. 3b shows the structure, in which one or more sheet-type bipolar electrodes are disposed with a solid electrolyte layer interposed therebetween, in the flexible secondary battery according to an embodiment of the present disclosure.

In addition, referring to FIG. 1 and FIG. 3b, one or more sheet-type solid electrolyte layers 420, and a bipolar electrode including another bipolar electrode current collector 430, and a positive electrode active material layer and a negative electrode active material layer formed on both surfaces thereof may be further provided between the second solid electrolyte layer 500 and the bipolar electrode 400 which includes the bipolar electrode current collector 410, the positive electrode active material layer formed on one surface of the current collector and the negative electrode active material layer formed on the other surface of the current collector. In other words, according to the present disclosure, it is possible to design diverse voltage ranges from a low voltage to a high voltage by increasing the number of bipolar electrodes, if desired.

Figure 4:
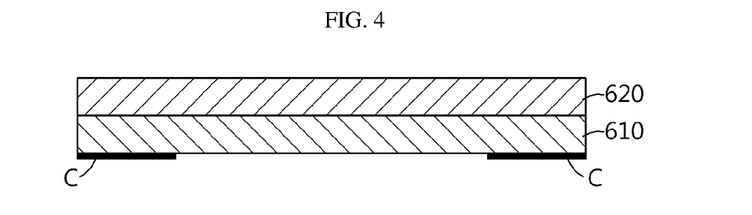
FIG. 4 shows the structure of a sheet-type external electrode included in the flexible secondary battery according to an embodiment of the present disclosure.

Further, referring to FIG. 1 and FIG. 4, the external electrode 600 includes an external current collector 620 and an external electrode active material layer 610 formed on one surface of the external current collector, wherein the external electrode active material layer 610 faces the second solid electrolyte layer.

Meanwhile, the first solid electrolyte layer 300 and the second solid electrolyte layer 500 include an organic solid electrolyte and function as media through which lithium ions are transported. The organic solid electrolyte may be a solid polymer electrolyte selected from polyethylene oxide (PEO), polypropylene oxide (PPO), polyethylene imine (PEI), polyethylene sulfide (PES) and polyvinyl acetate (PVAc); or a gel polymer electrolyte using a polymer selected from polyethylene oxide (PEO), polyvinylidene fluoride (PVdF), polyvinylidene fluoride-co-hexafluoropropylene (PVdF-HFP), polymethyl methacrylate (PMMA), polyacrylonitrile (PAN) and polyvinyl acetate (PVAc).

The first solid electrolyte layer 300 and the second solid electrolyte layer 500 are positioned between the internal electrode 200 and the bipolar electrode 400, and between the bipolar electrode 400 and the external electrode 600, respectively, and thus isolate those electrodes from each other. Since the solid electrolyte layer used herein includes an organic solid electrolyte, the solid electrolyte layer has relatively low mechanical strength. For this, the edge portion of each electrode may perforate the solid electrolyte to cause a short-circuit, during the winding of each constitutional element in a process for assemblage of a flexible secondary battery.

To overcome the above-mentioned problem, the secondary battery according to the present disclosure is provided with insulation coating portions at both longitudinal ends of the surface facing each solid electrolyte layer in each of the internal electrode, bipolar electrode and the external electrode (i.e. in the internal electrode active material layer 220 of the internal electrode 200, in the external electrode active material layer 610 of the external electrode 600, and in the positive electrode active material layer and the negative electrode material layer corresponding to both surfaces in the bipolar electrode 400). Therefore, the internal electrode 200 and the external electrode 600 are wound in such a manner that the insulation coating portions provided at both longitudinal ends may face the first solid electrolyte layer and the second solid electrolyte layer, respectively, when the secondary battery is assembled. For example, referring to FIG. 1 and FIG. 5, the insulation coating portion (shown by a dotted line) of the external electrode 600 is positioned inside of the external electrode and faces the second solid electrolyte layer 500.

Referring to FIGS. 2-4, in the sheet-type internal electrode, bipolar electrode and the external electrode, one of the longitudinal insulation coating portions (shown by "C" in each figure) provided on the surfaces of the electrode layers may independently have a width corresponding to 1-50%, particularly 5-10% based on the width of the sheet-type electrodes. When the width of the insulation coating portion satisfies the above-defined range, decrement in energy density is low and a possibility of electrical short-circuit may be reduced.

The flexible secondary battery according to the present disclosure has a structure in which sheet-type electrodes (an internal electrode, external electrode and a bipolar electrode) are sequentially wound spirally outside of an electrode support in a spiral shape. Herein, the sheet-type electrodes have a narrow width and have no additional non-coated portion (portion having no electrode active material layer formed therein).

If a non-coated portion having no electrode active material layer formed therein is provided additionally in order to introduce the insulation coating portion to such a non-coated portion, processability, such as electrode active material layer loading uniformity and slitting, may be degraded in manufacturing the electrodes.

In addition, when the insulation coating portion is introduced to a flexible secondary battery in the form of an independent sheet, flexibility, required essentially for a flexible secondary battery, may be degraded, resulting in degradation of life characteristics. Therefore, in the flexible secondary battery according to the present disclosure, the internal electrode and the external electrode are provided with insulation coating portions at both longitudinal ends of the surface facing the first solid electrolyte layer and the second solid electrolyte layer, respectively, and the bipolar electrode is provided insulation coating portions at both longitudinal ends of both surfaces, in order to prevent a short-circuit that may occur during the assemblage of the battery.

The insulation coating portion may include any material, as long as it has insulation property and can prevent a short-circuit caused by a contact between both electrodes due to high strength even when the edge portion of the electrode damages and perforates the solid electrolyte layer.

According to an embodiment of the present disclosure, the insulation coating portion may include oxide, nitride, carbide, or the like, alone or in combination.

Particularly, the insulation coating portion may include oxide, carbide or nitride of an element selected from the group consisting of Fe, Ca, Ba, Zn, Al, Ni, Sn, Cu, Cr, Cd, Nd, Mn, Mo, Si, Ti, W, Bi, Sr, Li, Y, Mg, Ce, Hf and V, or a combination thereof. More particularly, materials applicable to the insulation coating portion may include hafnia ($HfO_2$), $SrTiO_3$, $SnO_2$, $CeO_2$, $MgO$, $NiO$, $CaO$, $ZnO$, $ZrO_2$, $SiO_2$, $Y_2O_3$, $Al_2O_3$, $SiC$, $WC$, $TiO_2$, or the like, alone or in combination. In addition, the oxide may include an oxide-based solid electrolyte, and the oxide-based solid oxide may include a solid electrolyte having a structure of Li-A-O (wherein A is La, Zr, Ti, Al, P, I or a combination thereof), such as $Li_{3x}La_{2/3-x}TiO_3$ (LLTO, 0<x<1), $Li_7La_3Zr_2O_{12}$ (LLZO), $Li_{1+x}Al_xTi_{2-x}(PO_4)_3$ (LATP, 0<x<1), $Li_{1+x}Al_xGe_{2-x}(PO_4)_3$ (LAGP, 0<x<1), $Li_{1.4}Zn(GeO_4)_4$, $Li_3N$, $Li_{3+y}PO_{4-x}N_x$ (LIPON, 0<x<4, 0<y<3), $Li_{3.6}Si_{0.6}P_{0.4}O_4$, or a combination thereof.

According to an embodiment of the present disclosure, the insulation coating portion may be formed by dispersing an insulation material, such as the above-mentioned oxide, carbide, nitride, or the like, in a dispersion medium, adding a suitable binder resin, additives, or the like, thereto as necessary to obtain slurry, and applying the slurry to the edge portion of each electrode with a predetermined width.

When manufacturing an electrode assembly, the edge portion is significantly sharp due to burrs generated in an electrode cutting process. As compared to the conventional separator used for the conventional lithium ion battery, the solid electrolyte membrane functioning as a separator in a solid state battery has low strength. In a solid state battery, there is a high possibility of an electric short-circuit caused by the edge of a positive electrode that is in direct contact with or is very close to the surface of a negative electrode, resulting in a failure in operating as a battery. Therefore, many studies have been conducted to solve the problem related with the edge burrs of the positive electrode. As one method of such solutions, a process for attaching a polymer film to the edge burr portion has been applied. Although the attached polymer film has higher strength as compared to the conventional solid electrolyte membrane, there still is a limitation in solving the problem of positive electrode edge burrs. To prevent a short-circuit effectively, it is required to eliminate the cause of generating positive electrode edge burrs. Thus, according to an embodiment of the present disclosure, an oxide-based solid electrolyte having significantly higher strength as compared to the conventional polymer films may be applied to the insulation coating portion in order to prevent a short-circuit caused by the solid electrolyte layer damaged by the positive electrode edge burrs. Particularly, the oxide-based solid electrolyte may be introduced to the insulation coating portions at both longitudinal ends of one surface of each of the internal electrode and the external electrode, facing the first solid electrolyte layer and the second solid electrolyte layer, respectively, and at both longitudinal ends of both surfaces of the bipolar electrode.

Particularly, in the case of the flexible secondary battery according to the present disclosure, the sheet-type electrodes are wound under tension during its manufacture. Thus, the force by which the burrs damage the solid electrolyte layer is larger. As a result, it is preferred to introduce an oxide-based solid electrolyte to the insulation coating portion.

In addition, the sheet-type solid electrolyte layers may have a larger width and length as compared to the current collectors included in each of the electrodes.

Meanwhile, in the solid electrolyte layer, the matrix for solid electrolyte preferably includes a polymer or ceramic glass as a fundamental frame. In general, a polymer electrolyte has low strength and shows decreased strength as its thickness is decreased. Meanwhile, a gel polymer electrolyte, which facilitates ion transport as compared to a solid electrolyte, has low mechanical properties. Therefore, a support may be incorporated to supplement such disadvantages. The support may be a support having a porous structure or a crosslinked polymer. Since the electrolyte layer according to the present disclosure also functions as a separator, no additional separator may be required.

The solid electrolyte layer according to the present disclosure may further include a lithium salt. Such a lithium salt can improve ion conductivity and reaction rate, and particular examples thereof include LiCl, LiBr, LiI, $LiClO_4$, $LiBF_4$, $LiBF_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, $(FSO_2)_2NLi$, lithium chloroborate, lower aliphatic lithium carboxylate and lithium tetraphenylborate.

According to an embodiment of the present disclosure, the internal electrode may be a negative electrode, the side of the bipolar electrode facing the internal electrode may be a positive electrode layer and the opposite side may be a negative electrode layer, and the external electrode may be a positive electrode. According to another embodiment of the present disclosure, the internal electrode may be a positive electrode, the side of the bipolar electrode facing the internal electrode may be a negative electrode layer and the opposite side may be a positive electrode layer, and the external electrode may be a negative electrode.

Each of the internal electrode, bipolar electrode and the external electrode includes an electrode active material layer formed on a sheet-type current collector, wherein the sheet-type current collector may reduce the resistance of the battery, thereby providing improved battery performance. For example, it is possible to solve the problems occurring when the electrode current collector is a wire-type one, including a large resistance element derived from a small surface area and degradation of rate-characteristics of the battery caused by the battery resistance during high-rate charge/discharge.

Each of the internal electrode and the external electrode may further include a polymer film layer on the other surface of each current collector. The polymer film layer functions to support the internal current collector and the external current collector so that they may be formed to a thin film having a smaller thickness. For example, the internal current collector and the external current collector may be formed on the polymer film layer through a vapor phase deposition process, or the like.

The polymer film layer may include any one selected from the group consisting of polyolefin, polyester, polyimide, and polyamide or combinations thereof.

The electrode active material layers function to transport ions through the current collector, and such ion transport is based on the interaction of ion intercalation from the electrolyte layer and ion deintercalation to the electrolyte layer.

The electrode active material layers may be classified into a negative electrode active material layer and a positive electrode active material layer.

Particularly, the negative electrode active material layer may include, as an active material, any one selected from the group consisting of natural graphite, artificial graphite or carbonaceous materials; metals (Me) such as lithium-containing titanium composite oxide (LTO), Si, Sn, Li, Zn, Mg, Cd, Ce, Ni or Fe; alloys including the metal (Me); oxides (MeOx) of the metals (Me); and composites of the metals (Me) with carbon; or combinations thereof. The positive electrode active material layer may include, as an active material, any one selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic fraction of an element forming the oxide and $0 \leq x < 0.5$, $0 \leq y < 0.5$, $0 \leq z < 0.5$ and $x+y+z \leq 1$), or combinations thereof.

The electrode active material layer further includes an electrode active material, a binder and a conductive material, and is bound with the current collector to form an electrode. When the electrode is deformed, for example by folding or severe bending caused by external force, the electrode active material is separated off. Separation of the electrode active material may cause degradation of the capacity and performance of a battery. However, since the current collector has elasticity and functions to disperse force upon the deformation caused by external force, it is possible to alleviate deformation of the electrode active material layer and to prevent separation of the active material.

The conductive material may include any one selected from the group consisting of carbon black, acetylene black, Ketjen black, carbon fibers, carbon nanotubes, and graphene or combinations thereof.

The binder may be any one selected from the group consisting of polyvinylidene fluoride (PVdF), polyvinylidene fluoride-co-hexafluoropropylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxymethyl cellulose, styrene-butadiene rubber, acrylonitrile-styrene-butadiene copolymer, and polyimide, or combinations thereof.

In addition, in order to increase the surface area of the current collector used for each electrode, a plurality of dents may be formed on at least one surface of the current collector. Herein, the dents may have a continuous pattern or discontinuous pattern. In other words, the current collector may have dents spaced apart from each other along the longitudinal direction and having a continuous pattern, or may have a discontinuous pattern having a plurality of holes. The holes may have a circular shape or polygonal shape.

According to an embodiment of the present disclosure, the internal current collector and the bipolar electrode current collector may include stainless steel, aluminum, nickel, titanium, baked carbon or copper; stainless steel surface-treated with carbon, nickel, titanium or silver; aluminum-cadmium alloy; a non-conductive polymer surface-treated with a conductive material; or a conductive polymer, preferably.

The current collector collects electrons generated by electrochemical reactions or supply electrons required for electrochemical reactions. In general, the current collector includes a metal, such as copper or aluminum. Particularly, when using a non-conductive polymer surface-treated with a conductive material or a polymer conductor including a conductive polymer, it is possible to provide higher flexibility as compared to metals, such as copper or aluminum. In addition, it is possible to reduce the weight of a battery by using a polymer current collector instead of a metallic current collector.

The conductive material may include polyacetylene, polyaniline, polypyrrole, polythiophene, polysulfur nitride, indium tin oxide (ITO), copper, silver, palladium and nickel. The conductive polymer may include polyacetylene, polyaniline, polypyrrole, polythiophene and polysulfur nitride. However, the non-conductive polymer used for a current collector is not particularly limited.

According to the present disclosure, the external current collector may include: stainless steel, aluminum, nickel, titanium, baked carbon or copper; stainless steel surface-treated with carbon, nickel, titanium or silver; aluminum-cadmium alloy; non-conductive polymer surface-treated with a conductive material; conductive polymer; metal paste containing metal powder such as Ni, Al, Au, Ag, Al, Pd/Ag, Cr, Ta, Cu, Ba or ITO; or carbon paste containing carbon powder such as graphite, carbon black or carbon nanotubes. Herein, the conductive material and the conductive polymer may be the same as those used for the above-described internal current collector.

According to an embodiment of the present disclosure, the electrode support may have an open structure having a space therein. The term 'open structure' refers to a structure which has the open structure as a boundary surface and allows substance to freely transfer from the inside to the outside through the boundary surface.

Such an electrode support having an open structure may include at least one spirally wound wire, at least one spirally wound sheet, hollow fibers, or a mesh-type support, and may have pores on the surface thereof so that an electrolyte moves freely to the internal electrode active material and external electrode active material to facilitate wetting.

In addition, the electrode support may be at least two linear wire supports disposed in parallel with each other, or at least two wire-type supports wound spirally so that they may cross each other.

The electrode support having an open structure allows a secondary battery to maintain its linear shape, prevents deformation of a battery structure caused by external force and prevents a collapse or deformation of an electrode structure, thereby ensuring flexibility of the secondary battery.

The hollow fibers may be obtained through a conventional hollow fiber forming process by using at least one polymer selected from the group consisting of polyethylene, polypropylene, polytetrafluoroethylene, polyvinylidene fluoride, polyacrylonitrile, polyimide, polyethylene terephthalate, polyamide imide, polyester imide, polyether sulfone and polysulfone.

In addition, the wound wire-type support may have a shape like a spring structure made of a polymer or metal. Herein, the polymer may include a material having excellent chemical resistance and showing no reactivity with an electrolyte, and particular examples thereof may be the same as described with reference to the materials for the hollow fiber or binder polymer. Further, the metal may be the same as described with reference to the current collector.

Herein, the electrode support may have a diameter of 0.1-10 mm. In addition, it may have pores having a diameter of 100 nm to 10 μm on the surface thereof.

Further, the electrode support according to an embodiment of the present disclosure may be provided with a structure having no inner space. Particular examples of the structure include a linear wire or a twisted wire. Such a linear wire or twisted wire may be made of the above-mentioned polymer or metal. Herein, the term 'linear wire' means a wire extended longitudinally in a linear shape and 'twisted wire' means a shape of wire formed by such a linear wire twisted by itself while not forming any inner space.

In addition, an internal electrode current collector core portion may be formed in the space formed inside of the electrode support.

Herein, the internal electrode current collector core portion may be made of carbon nanotubes, stainless steel, aluminum, nickel, titanium, baked carbon or copper; stainless steel surface-treated with carbon, nickel, titanium or silver; aluminum-cadmium alloy; non-conductive polymer surface-treated with a conductive material; or a conductive polymer.

The flexible secondary battery according to an embodiment of the present disclosure may have a horizontal section with a predetermined shape and a linear structure extended longitudinally to the horizontal section. Therefore, the flexible secondary battery according to the present disclosure may have flexibility and deformed freely. Herein, the term 'predetermined shape' refers to a shape not limited particularly, and includes any shapes without departing from the scope of the present disclosure.

According to an embodiment of the present disclosure, the flexible secondary battery may be further provided with a protective coating, and the protective coating is an insulating body formed on the outer surface of the external current collector in order to protect the electrodes from moisture in the air and external impact.

The protective coating may include a conventional polymer resin including a moisture-interrupting layer. Herein, the moisture-interrupting layer may include aluminum or a liquid crystal polymer having excellent moisture-interrupting property, and the polymer resin may include PET, PVC, HDPE or epoxy resin.

Figure 5:
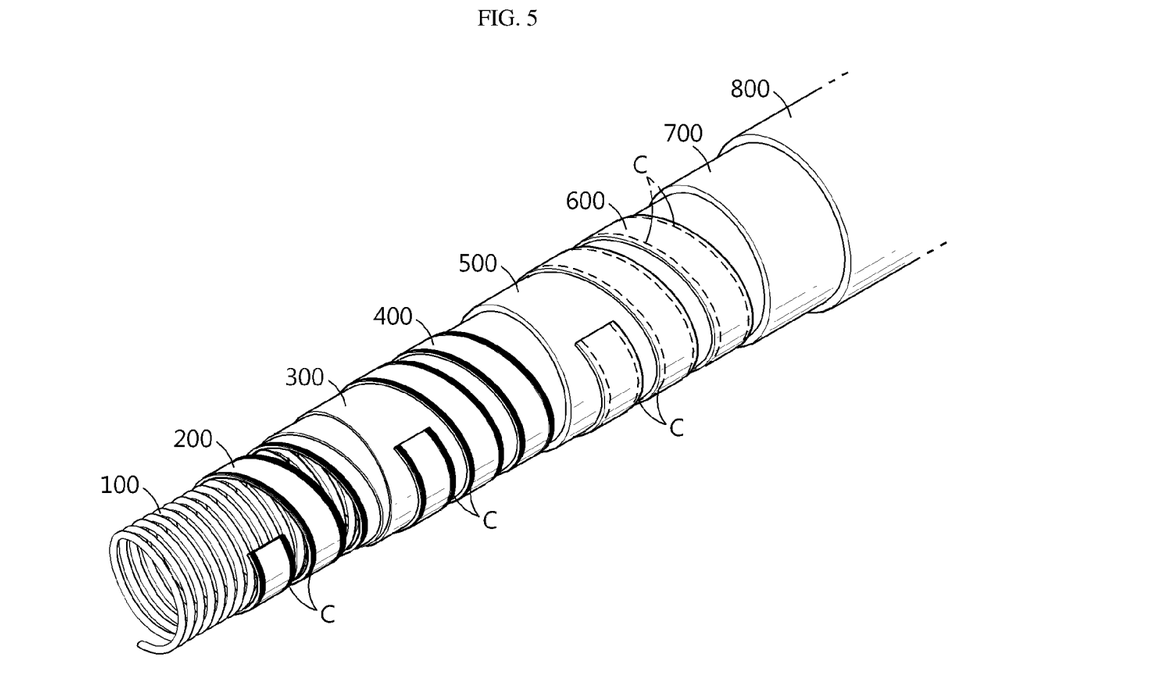
FIG. 5 shows the flexible secondary battery according to an embodiment of the present disclosure.

Referring to FIG. 5, the flexible secondary battery according to an embodiment of the present disclosure includes: an electrode support 100; a sheet-type internal electrode 200 wound spirally outside of the electrode support 100; a sheet-type first solid electrolyte layer 300 wound spirally outside of the internal electrode 200; a sheet-type bipolar electrode 400 wound spirally outside of the first solid electrolyte layer 300; a sheet-type second solid electrolyte layer 500 wound spirally outside of the bipolar electrode 400; a sheet-type external electrode 600 wound spirally outside of the second solid electrolyte layer 500; an aluminum pouch layer 700 formed outside of the external electrode 600; and a polymer protective coating 800 formed outside of the aluminum pouch layer 700.

The pouch layer may be provided with a moisture-interrupting layer including a metal, such as aluminum, an insulation layer formed on one surface of the moisture-interrupting layer and including polyester, such as PET, or polyamide, such as nylon, and a thermal adhesive layer formed on the other surface of the moisture-interrupting layer and including polypropylene, polycarbonate, polyethylene, or the like. In addition, the polymer protective coating 800 may be a packaging formed by over-molding of a polymer material.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

DESCRIPTION OF DRAWING NUMERALS

100: Electrode support
200: Internal electrode
300: First solid electrolyte layer
400: Bipolar electrode
500: Second solid electrolyte layer
600: External electrode
700: Aluminum pouch layer
800: polymer protective coating

What is claimed is:

1. A flexible secondary battery comprising:
an electrode support;
a sheet-type internal electrode wound helically outside of the electrode support;
a sheet-type first solid electrolyte layer wound helically outside of the internal electrode;
a sheet-type bipolar electrode wound helically outside of the first solid electrolyte layer;
a sheet-type second solid electrolyte layer wound helically outside of the bipolar electrode; and
a sheet-type external electrode wound helically outside of the second solid electrolyte layer,
wherein each of the first solid electrolyte layer and the second solid electrolyte layer includes an organic solid electrolyte,
the internal electrode is provided with insulation coating portions at both longitudinal ends of one surface facing the first solid electrolyte layer, the external electrode is provided with insulation coating portions at both longitudinal ends of one surface facing the second solid electrolyte layer, the bipolar electrode is provided with insulation coating portions at both longitudinal ends of opposing surfaces thereof.

2. The flexible secondary battery according to claim 1, wherein the internal electrode and the external electrode are wound in such a manner that the insulation coating portions provided at both longitudinal ends face each of the first solid electrolyte layer and the second solid electrolyte layer, respectively.

3. The flexible secondary battery according to claim 1, which is further provided with at least one further sheet-type solid electrolyte layer and at least one further sheet-type bipolar electrode between the bipolar electrode and the second solid electrolyte layer.

4. The flexible secondary battery according to claim 1, wherein the organic solid electrolyte is a solid polymer electrolyte selected from polyethylene oxide (PEO), polypropylene oxide (PPO), polyethylene imine (PEI), polyethylene sulfide (PES) and polyvinyl acetate (PVAc).

5. The flexible secondary battery according to claim 1, wherein each of the insulation coating portions provided in the sheet-type internal electrode, the bipolar electrode and the external electrode independently has a width corresponding to 1-50% based on the width of the respective sheet-type electrode.

6. The flexible secondary battery according to claim 1, wherein at least one of the insulation coating portions comprises oxide, carbide or nitride of an element selected from the group consisting of Fe, Ca, Ba, Zn, Al, Ni, Sn, Cu, Cr, Cd, Nd, Mn, Mo, Si, Ti, W, Bi, Sr, Li, Y, Mg, Ce, Hf and V, or a combination thereof.

7. The flexible secondary battery according to claim 1, wherein at least one of the insulation coating portions comprises an oxide-based solid electrolyte.

8. The flexible secondary battery according to claim 7, wherein the oxide-based solid electrolyte comprises $Li_{3x}La_{2/3-x}TiO_3$ (LLTO, $0<x<1$), $Li_7La_3Zr_2O_{12}$ (LLZO), $Li_{1+x}Al_xTi_{2-x}(PO_4)_3$ (LATP, $0<x<1$), $Li_{1+x}Al_xGe_{2-x}(PO_4)_3$ (LAGP, $0<x<1$), $Li_{1.4}Zn(GeO_4)_4$, $Li_3N$, $Li_{3+3}PO_{4-x}N_x$ (UPON, $0<x<4$, $0<y<3$), $Li_{3.6}Si_{0.6}P_{0.4}O_4$, or a combination thereof.

9. The flexible secondary battery according to claim 1, wherein the internal electrode comprises an internal current collector and an internal electrode active material layer formed on one surface of the internal current collector, and the external electrode comprises an external current collector and an external electrode active material layer formed on one surface of the external current collector.

10. The flexible secondary battery according to claim 1, wherein the bipolar electrode comprises a bipolar electrode current collector, a positive electrode active material layer formed on one surface of the current collector and a negative electrode active material layer formed on another surface of the current collector.

11. The flexible secondary battery according to claim 1, wherein the sheet-type internal electrode, the first solid electrolyte layer, the bipolar electrode, the second solid electrolyte layer and the external electrode each has a strip-like structure extended in one direction.

12. The flexible secondary battery according to claim 1, wherein the electrode support has an open structure having a space therein.

13. The flexible secondary battery according to claim 1, wherein the electrode support comprises at least one helically wound wire, at least one helically wound sheet, twisted wire, linear wire, hollow fiber, mesh-type support, at least two linear wire supports disposed in parallel with each other, or at least two wire-type supports wound helically so that they cross each other.

14. The flexible secondary battery according to claim 1, which further comprises a protective coating formed to surround an outer surface of the external electrode.

15. The flexible secondary battery according to claim 1, wherein the organic solid electrolyte is a gel polymer electrolyte using a polymer selected from polyethylene oxide (PEO), polyvinylidene fluoride (PVdF), polyvinylidene fluoride-co-hexafluoropropylene (PVdF-HFP), polymethyl methacryate (PMMA), polyacrylonitrile (PAN) and polyvinyl acetate (PVAc).

* * * * *